United States Patent Office 3,448,069
Patented June 3, 1969

3,448,069
BASE CURING FURYLETHYLENEALDEHYDE CYCLOHEXANONE ADHESIVE COMPOSITION
Lloyd H. Brown, Crystal Lake, and David D. Watson, Barrington, Ill., assignors to The Quaker Oats Company, Chicago, Ill., a corporation of New Jersey
No Drawing. Filed Jan. 20, 1966, Ser. No. 521,823
Int. Cl. C08g 51/04, 37/28
U.S. Cl. 260—32.8                6 Claims

ABSTRACT OF THE DISCLOSURE

A liquid binder for refractory materials comprising cyclohexanone, a basic catalyst and a resin produced by an acidic resinification of a furylethylenealdehyde, with or without formaldehyde.

---

This invention relates to a novel base-curing highly reactive adhesive composition and to methods of using this composition, particularly in the area of basic refractory art.

An important property for an adhesive system is that the system provide a wide degree of latitude in viscosity, and yet provide a high level of cured solids. Viscosity control is useful in some applications to prevent excessive penetration of the adhesive into a porous material, thereby resulting in a depleted glue line. Yet in other applications, it is desirable or essential that the adhesive have low viscosity, thereby facilitating pumping, spraying or spreading of the adhesive, or penetration of the curable adhesive into small spaces as in use as a potting compound. Yet while addition of some solvents to resin may reduce viscosity, the diluted resins will often suffer proportional decrease in cured solids, decreased reactivity and other undesirable consequences, as gas evolution. Shrinkage, explosive hazards and possible toxicity must also be considered.

A property which is desirable in most raw refractories, i.e., comparative chemical inertness, leads to a very common problem during the fabrication, application, installation or use of a particular refractory mixture. That problem is structural instability at low or at intermediate temperatures. For example, some batches made at low to intermediate temperatures disintegrate or lift out upon heating. Bonding a basic refractory with pitch is only a partial solution, since pitch bonded refractory bricks may slump during heating to low or intermediate temperatures. Many currently available basic refractory gunning mixes must be carefully dried after application to prevent rupture of the monolithic structure upon heating. Oftentimes, bricks and related shapes are carefully prefired in order to develop ceramic bonds and resulting strength prior to their installation in order to provide good low and intermediate temperature strength and structural stability.

Another problem common to many uses of refractories is the absence of good adhesion qualities of refractory mix formulations as a result of which the refractory mixes do not adequately adhere to structural materials such as an old refractory layer or a sub-layer, as, for example, in the application of gunning and ramming mixes and the like over safety linings or slag covered vessel walls. While furan-derived refractory adhesives have many desirable properties, acid catalyzed adhesive binders, such as these, are often unsuitable for use with many common alkaline refractories such as magnesite, dolomite and the like. It is well-known that an alkaline pH is usually obtained when either an "acidic" or "basic" refractory is admixed with water. However, a good general purpose refractory binder must be capable of hardening or setting in either acidic or alkaline pH conditions. Moreover, such a binder must not interfere with the formation of high temperature or ceramic compounds when the shape is heated to high operating temperatures and yet such a binder must provide structural stability as the temperature of the refractory is being elevated to the high operating temperature. A further desirable characteristic of such an adhesive is the characteristic of providing high levels of carbon solids residue upon heating (pyrolysis) to the operating temperatures in which the refractory is used. It has become apparent during recent developments in the gunning of the basic refractory linings which are used in basic oxygen process furnaces that a most desirable characteristic of an adhesive binder is that of low viscosity, such as 100 cps. or less, at ambient installation temperatures, such as, for example, 40° F. to 100° F.

Hence, it is an object of this invention to provide a novel highly reactive alkaline curing adhesive composition which provides a very high level of solids residue upon curing. Another object of this invention is to provide a low viscosity binder composition having a low toxicity. A further object of this invention is to provide a novel alkaline curing composition, the viscosity of which can be adjusted to provide a desired and necessary degree of fluidity over a very wide range of temperature conditions. A still further object of this invention is to provide an alkaline curable adhesive which can gel extremely rapidly (i.e., in less than a minute, preferably in less than 30 seconds) when catalyzed. It is an additional object to provide an adhesive composition which provides substantially constant high uniform cured solids level over a wide viscosity range. It is also an object of this invention to provide a novel refractory mix which provides a high degree of strength and structural stability at low and intermediate temperatures as well as at high temperatures. It is a still further object of this invention to provide a refractory mix which effects adhesion to a wide variety of structural materials commonly encountered in refractory applications. A specific object of this invention is to provide a method utilizing the special adhesive composition of this invention, of fabricating monolithic refractory linings by use of gunning techniques which do not require heating of binder to reduce its viscosity. Another specific object of this invention is to provide a method of utilizing the mix of this invention to produce pitch bonded basic refractory bricks which are not subject to appreciable slumping at intermediate temperatures. A further specific object of this invention is to provide a method of patching and fabricating ladle, furnace and other linings whereby a high degree of adhesion, rapid setting and high low-temperature and high intermediate-temperature strength are accomplished.

These and other objects which will be apparent hereinafter are accomplished by the special adhesive composition of this invention, namely, a composition comprising a minor portion of cyclohexanone and a major portion of resin produced by the acidic resinification of a composition comprising A moles of formaldehyde and B moles of furylethylenealdehyde of the Formula 1,

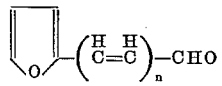

Formula 1 wherein $n$ is a number from 1 to 7 inclusive, said A and B being numbers such that the ratio A/B is in the range zero to 1.5, inclusive.

The selection of particular inorganic refractory materials for particular use will depend solely on the requirements of the use intended and this selection is within the purview of one skilled in the refractory or ceramic art. However, the particular inorganic refractory materials which can be used in conjunction with the adhesive composition of this invention may be either "acidic" or "basic" in the refractory sense and may be either acidic or alkaline in the aqueous pH sense. It is not essential that a catalyst be used in conjunction with the adhesive of this invention in those embodiments involving acidic or alkaline materials. However, if a catalyst is used, it is preferred that alkaline catalysts (such as sodium hydroxide, ammonium hydroxide, or organic bases, such as those sometimes found in pitch) be used in those embodiments employing alkaline refractory materials. Either acidic or alkaline catalysts may be used with refractory mixes utilizing refractories having an essentially neutral pH. Acidic catalysts (such as sulfonic acids, phosphoric acid) can be used if the inorganic refractory has an acidic pH, or a slightly basic pH such as is encountered with some brick grog or clay mixes.

The resin components of this invention which utilize formaldehyde can be prepared in accordance with the teachings of U.S. Patent No. 2,527,714, issued to A. P. Dunlop and E. L. Washburn, and assigned to The Quaker Oats Company. Resin components of this invention which do not utilize formaldehyde are also made in like manner except that the formaldehyde ingredient is not present during the acidic resinification step. It is clear that these embodiments A, and the ratio A/B defined above, are zero.

The adhesive compositions of this invention which do not utilize formaldehyde (i.e., those in which the ratio A/B is zero) are preferred because these adhesive compositions have been found to provide strengths equivalent to that obtained by use of compositions of this invention which utilize formaldehyde but do not present the formaldehyde odor problems which are sometimes encountered utilizing formaldehyde-containing embodiments. In the fabrication of the resin components of this invention which do utilize formaldehyde, however, the preferred molar ratio of formaldehyde to compound having Formula 1 is between 0.2 to 0.5, inclusive, although higher molar ratios, e.g., 0.7 to about 1.1 or higher may be utilized if odor development is not particularly undesirable in the specific application intended. Generally, however, the molar ratio of formaldehyde to compound of Formula 1 should not exceed 1.5. Odor problems connected with the use of the adhesive compositions of this invention which utilize formaldehyde can be eliminated or alleviated by use of appropriate reaction modifiers such as those used in Example 4 below.

In the manufacture of the resin component of the composition of this invention, the ingredient used as compound of Formula 1 need not be a pure compound, nor would a pure compound be particularly desirable. Mixtures of compounds of Formula 1 can be made in accord with the teachings of the Dunlop and Washburn U.S. Patent 2,527,714, or as illustrated hereinafter by any other equivalent means. The crude reaction mixture will generally be a mixture of compounds so that for a given mixture $n$ of Formula 1 represents a number average value, and includes any number, and fractional number, from 1 to 7 inclusive, preferably from 1 to 4, inclusive. Mixtures of compounds of Formula 1 more preferred for use in preparation of the adhesive composition of this invention are those mixtures produced by alkaline coupling of acetaldehyde and furfural in a molar ratio between about 1.7 and about 2.2. In embodiments utilizing mixtures of compounds of Formula 1 prepared by alkaline coupling of acetaldehyde and furfural in a molar ratio below about 1.7, crystalline materials tend to form in the final resin upon standing. While crystal formation in the binder can be alleviated by extending the time of the acidic resinification reaction, the use of this alternative will not be desirable in all cases since the viscosity development is also somewhat proportional to time duration of the acidic resinification reaction.

In the preparation of adhesive compositions of this invention which utilize formaldehyde for applications requiring particularly low viscosities, it is preferred that the acidic resinification step be continued until resin viscosities in the range 10,000 to 20,000 are achieved. These resins are admixed with cyclohexanone to provide highly reactive adhesive compositions having lower viscosity. On the other hand, higher viscosities, or even crystal formation, are of less consequence in those embodiments of this invention involving the manufacture of bricks and refractory shapes, as, for example, pitch-containing magnesite brick.

The highly reactive alkaline curing adhesive composition comprising a minor portion of cyclohexanone and a major portion of the resin defined above has been discovered to provide solids levels upon cure which are equivalent to those adhesive compositions which contain the viscous resin used alone. Moreover, the novel adhesive compositions of this invention have been found to provide extremely rapid curing rates under alkaline conditions, more rapid than the resin itself, and in addition they have been found to provide very low viscosities prior to cure. The "minor portion" of cyclohexanone referred to herein is intended to mean that the amount of cyclohexanone in the adhesive composition is less than 50% by weight based on the weight of the adhesive composition. By "major portion" of resin is meant that resin is present in an amount greater than 50% on the same basis. Generally speaking, adhesive compositions of this invention comprising cyclohexanone in an amount up to 0.67 parts per part of resin composition are preferred.

As indicated above, one of the objects of this invention is to provide an alkaline curable adhesive composition which when catalyzed can gel extremely rapidly (i.e., exhibit a "gel time" of less than a minute, preferably in less than 30 seconds). Such "high speed" embodiments are particularly useful in in situ fabrication of monolithic refractory linings when catalyzed. The following empirical "gel time" test was used to obtain a parameter by which rate of gelation can be estimated. This procedure is used to determine the number referred to herein as "gel time": the room temperature sample (10.0 grams) is placed in a 4-ounce (double) paper cup and 50% aqueous sodium hydroxide catalyst (1.5 ml.) is added quickly from a burette. When catalyst addition is complete, the stopwatch is immediately started and simultaneously he cup contents are stirred vigorously with a spatula. After a period of time, which is surprisingly reproducible, the sample will rather abruptly start to "rise," i.e., increase in volume, as the sample starts to gel. The time lapse from completion of addition of catalyst until the beginning of the "rise" is recorded as the "gel time."

It should be emphasized that a rapid gel time is not an essential requirement for every use of the composition of this invention. However, it will be clear from the description contained herein that only those adhesives of this invention having rapid gel times are used in fabrication of monolithic refractory linings. In many other applications utilizing the adhesive of this invention, longer gel times and, hence, longer working life will be preferred.

If a longer working life is desired, or required, one can prepare the adhesive of this invention by a procedure involving relatively lower degrees of acidic resinification by reducing the time at that step, or decrease the level of basic catalysis in the final use. On the other hand, if a more rapid gel or shorter working life is desired, or required, one can increase the degree of acidic resinification, or increase the level of basic catalyst in the final use. Surprisingly, the speed of gelation of the cyclohexanone-containing adhesives of this invention is faster than the resin from which it is prepared. This is particularly surprising since cyclohexanone itself gave no evidence of polymerization even after long periods of time when subjected to equivalent catalysis. Non-deleterious quantities of other materials may be used in conjunction with the adhesive composition of this invention to further modify its properties. Furfuryl alcohol or furfural, e.g., 5% of the weight of the binder, or pine oil, e.g., 0.5% of the binder, are examples of such other materials.

Those adhesives of this invention which are intended for use in gunning of basic refractory linings are formulated to provide gel times less than 60 seconds, preferably less than 30, as measured by the gel-time test described above. With the aid of this gel test and standard viscosity tests, one with ordinary skill can conveniently determine an optimum composition ratio of a particular resin and cyclohexanone in compositions of this invention for use in fabrication of a monolithic lining, or other specific use. Hence, as a series of these tests are conducted using increasing levels of cyclohexanone, three properties are observed: (1) decrease in viscosity which drops rapidly with the addition of small quantities of cyclohexanone, (2) gel time which decreases sharply with initial additions of cyclohexanone and increases slightly with increasing quantities of cyclohexanone within the composition ranges which are in accordance with this invention, and (3) the firmness of the resulting gel. Preferably, a firm gel should result from the gel-time test, or shortly thereafter, and compositions of resin and cyclohexanone which produce soft gels generally have more than the preferred amounts of cyclohexanone. Gels are generally considered firm if they are tack-free; and while some of the firm gels are elastic, others are brittle.

Refractory mixes of this invention intended for use in fabrication of monolithic linings or patches are preferably made in situ as is illustrated in Example 4 below. In preferred methods of preparation of these refractory mixes, the reaction modifiers such as catalysts and odor depressants, if any, are premixed with the inorganic refractory aggregate. Preferred alkaline catalysts include 50% aqueous urea solution, 50% caustic solution, ammonia and triethylene-tetramine.

The inorganic refractory aggregate admixed with catalyst is conveyed to a point of application in a high velocity air stream, and the special liquid adhesive is admixed with the aggregate-catalyst mixture (e.g., sprayed into the air stream) near the point of application of the mixture, preferably at or in the nozzle or discharge orifice of the air conveying means. The mixture laden high velocity air stream is directed against a solid surface and the catalyst-refractory-binder mixture adheres to the surface forming a hard monolithic layer in a very short time.

The special adhesive compositions of this invention which are most preferred for these gunning embodiments are those in which the ratio A/B above is zero, have a viscosity less than 100 cps. at room temperature and a "gel time" less than 25 seconds. The preferred resins used in the preparation of adhesives of this invention intended for this type of application are those prepared from a furylethylenealdehyde composition which is a mixture formed by the alkaline coupling of furfural and acetaldehyde having a molar ratio between 1.7 and 2.5. The novel low viscosity alkaline-curing adhesive compositions of this invention eliminate the need of heating either the adhesive composition or the refractory mix in such gunning operations. Hence, it is a significant contribution to the art that as a result of this invention the monolithic linings may be formed by gunning a basic refractory with an organic binder over the wide range of ambient temperatures normally encountered in a steel mill, e.g., from above 100° F. down to about 40° F., without the necessity of preheating some or all of the materials used in the application.

The preferred amount of binder incorporated into a refractory mix during such gunning operations will depend somewhat on the coarseness or fineness of the refractory mix. Generally, if a relatively coarse refractory mix is utilized, it is preferred that binder be used in an amount of from 3 to 7% by weight inclusive, based on the weight of refractory. In the refractory mix is relatively fine, the preferred amounts will be higher, e.g., in the range 7 to 12% inclusive. Generally, the 4 to 10% range is most preferred. In any event, the operator, applying the refractory mix of this invention by means of a gun similar to that described above, can adjust the amount of binder being sprayed in the event the applied refractory mix appears "too dry" or "too wet."

In all the examples herein, parts in parts by weight, and per cent is in per cent by weight, and any reference to resin pH is as measured on a pH meter using glass calomel electrodes immersed in the stirred water-containing resin sample. Any reference herein to a specific acidic, alkaline or neutral pH of a refractory, unless otherwise indicated, is based on the pH of the water (100 parts) admixed with the refractory (50 parts) as measured at room temperature by a glass calomel electrode system with a pH meter.

Example 1

Furfural (144 parts) and acetaldehyde (145.2 parts) were premixed under a nitrogen gas blanket. In a different reactor fitted with addition means, means for external heating, and means for refluxing and distilling, water (42 parts) and 25% aqueous sodium hydroxide solution (2.1 parts) were admixed and heated to about 100° C. After nitrogen blanket was established over this solution, the furfural acetaldehyde mixture was added slowly to the hot alkaline solution over a period of about 4½ hours at a rate which kept the solution refluxing at slightly below 100° C. without external heat. Two hours after the beginning of the addition, an additional two parts of the 25% caustic solution was added, and at 3½ hours from the beginning of the addition, an additional 1.6 parts of caustic solution was added. After the furfural-acetaldehyde solution addition was complete, the system was maintained at reflux for about thirty minutes, during which time the pot temperature rose from about 94° to about 101° C. The batch was then cooled to about 70° C. and acidified to pH 1.3 by the incremental addition of hydrochloric acid. The acidified batch was then heated to 100° C. and maintained at reflux by use of external heat for a period of two hours. During this period the viscosity as measured by a 108-ml.-viscosity cup with a ⁹⁄₃₂″ aperture increased from 40.2 seconds to 45.8 seconds. The batch was then adjusted to pH 4.7 by means of incremental addition of 25% sodium hydroxide solution. The entire batch was then vacuum distilled for about 4 hours at temperatures from about 84° C. to about 94° C. at pressures down to 71 mm. of mercury. The procedure of Example 1 gave 235 parts of resin and about 150 parts of distillate. This resin was dispersed in cyclohexanone at the ratio of 10 parts of resin to 3 parts of cyclohexanone to provide a novel adhesive composition in accordance with this invention.

Generally, after the initial alkaline polymerization of furfural and acetaldehyde is completed, the pH of the resulting furylethylenealdehyde mixture can be adjusted to between about 3 and about 7, preferably between 4 to 6, inclusive, and left at that pH for long periods of time at ambient room temperatures with no detrimental effect. The pH of the system during the acidic resinification is preferably below about 1.4. However, the reaction becomes difficult to control at pH appreciably below about 1.0 if formaldehyde is present even though considerably lower pH's (e.g., pH 0.8) can be used safely during the acidic resinification step in those embodiments which do not utilize formaldehyde. In any event, the pH should be adjusted to between about 4.5 and 6.5 after the acid resinification step and before the final distillation of water from the crude resin mixture. Although some water may be left in the resin product, it is preferable that substantially all the water be removed from the crude resin, e.g., by distillation.

Example 2

This example also illustrates the preparation of a preferred composition of this invention. Calcium hydroxide powder (13.4 parts, or 2% of the furfural) and water (125 parts) were charged to a reactor equipped with a thermometer, a stirrer and a delivery tube which discharged into the bottom of the reactor. The reactor was also hermetically joined to a water-jacketed condenser which in turn was hermetically joined to a Dry Ice-isopropanol trap. The limewater charge was heated to reflux and a mixture of furfural (672 parts) and acetaldehyde (at a 1:1.75 mole ratio of furfural to acetaldehyde) were added as rapidly as possible through a nitrogen atmosphere while maintaining a minimum pot temperature at 90° C. with an external heat source. The furfural-acetaldehyde addition required about 90 minutes and when it had been completed the charge was refluxed until the pot temperature reached 100° C. The charge was then cooled to about 90° C. and the pH was adjusted to 1.10 with 58 parts of 18.5% hydrochloric acid. The charge was then heated to reflux again and refluxing was continued. During this final reflux period the viscosity development was followed by empirical measurements made with a 15 mm. pipette. (The pipette employed delivered 50.0 mls. of water at room temperature in about 21 seconds), and delivered 50.0 ml. of hot reactor contents in 24.9 seconds at the beginning of the reflux period. After 61 minutes of refluxing, the viscosity of the reactor contents increased so that 29.0 seconds were required for the delivery of 50.0 mls. of hot resin from the same pipette. The recator contents where then vacuum stripped up to 85° C. at 75° mm. Hg pressure.

The resulting residue had a viscosity of 620 cps. at 25° C. and was obtained at a yield of 95% of the theoretical. A 10.0 gram sample of this resin was admixed with 1.5 mls. of 50% sodium hydroxide solution and stirred vigorously as described above in the "gel-time test." It expanded exothermically in 42 seconds and formed a firm gel. A portion of the resin produced as above in Example 2 was intimately admixed with cyclohexanone in the ratio of 10 parts resin to 3 parts cyclohexanone to provide the novel adhesive composition of this invention. When 10 grams of this cyclohexanone-resin composition was catalyzed with 1.5 mls. of 50% sodium hydroxide as above in the gel-time test, it expanded exothermically to a gel in only 28 seconds. The gel became brittle within about 10 seconds thereafter. Cyclohexanone, when subjected to a substantially identical test, evidenced no observable reaction even after 5 minutes.

Example 3

This example illustrates the production of several compositions of this invention following substantially the same procedure of Example 2, except that at the beginning of the acidic resinification step various pH's were employed ranging from pH 0.8 to pH 1.2. Also, 0.5 mole formaldehyde per mole of furfural charged was present at the beginning of the resinification step in Test No. 3–7. The pertinent process data is summarized in Table 1.

TABLE 1

| Test No. | Acidic reaction pH | Acidic reaction time | Pipette drainage test ΔT(sec.) during acidic reaction | Viscosity (cps.) of product | |
|---|---|---|---|---|---|
| | | | | Undiluted viscosity | Diluted viscosity at dilution |
| 3–1 | .80 | 29 | 3.8 | 990 | |
| 3–2 | .90 | 39 | 4.1 | 1,425 | 93 at 3.3/1. |
| 3–3 | .90 | 60 | 11.3 | 2,960 | 124 at 3/1. |
| 3–4 | 1.00 | 45 | 4.4 | 1,280 | |
| 3–5 | 1.10 | 61 | 4.1 | 620 | 57 at 3.3/1. |
| 3–6 | 1.20 | 76 | 4.0 | 915 | |
| 3–7 | 1.20 | 60 | 3.5 | 17,500 | 115 at 2/1. |

The resin-cyclohexanone composition produced by the test designated No. 3–7 in Table 1 formed a gel in only 18 seconds when subjected to the gel-time test described above. This composition was eminently satisfactory for use in a gunning method of fabricating a basic monolithic refractory lining in the method described below in Example 6, with all materials employed being at ambient temperatures, even though the viscosity of the composition was greater than the preferred viscosities, i.e., greater than 100 cps. at 25° C.

Example 4

This example illustrates the use of the adhesive of this invention in a gunning system to fabricate an in-place patch in a large steel ladle. In this example, catalysts and resin modifiers are added to the muller in which the inorganic refractory aggregate is blended in the amounts set forth in Table 2. In Table 2 TETA refers to triethylenetetramine and basic aggregrate refers to a magnesite, dead-burned dolomite refractory mixture.

Table 2

| | |
|---|---|
| Basic aggregate | 2000 |
| Urea | 12 |
| $H_2O$ (premixed) | 12 |
| NaOH | 10 |
| $H_2O$ (premixed) | 10 |
| TETA | 6.5 |
| $NH_4OH$ (28% $NH_3$) | 1.0 |

While this refractory mix appears slightly damp, it is comparatively free-flowing and is readily handled in the Jetliner Gun Model 240S. In this type of gun, which is readily available in commerce, the refractory mix is conveyed to the point of application in a high velocity air steam by means of flexible hoses approximately 2 inches in diameter. Near the point of discharge from the refractory conveying hose, a binder can be injected, or discharged, into the refractory-containing air stream by means of orifices or nozzles disposed in or around the refractory conveying nozzle. In the procedure of this example the above Jetliner Gun is employed in accordance with this invention to apply the above mulled refractory at the rate of about 5 tons an hour or higher, in admixture with the binder, by directing the high velocity air stream containing the admixture against the surface to be lined.

An adhesive composition of this invention produced as in Example 2 is injected into the air stream (at the nozzle which discharges the high velocity air stream containing the above refractory mix) at such a rate that the resulting patch contains between about 4 and about 5% resin by weight based on the weight of the applied refractory. Because of the low viscosity the binder coats the refractory well, and because of the high rate of gelation an extremely high proportion of the gun refractory mix adheres to the ladle wall and sets to form a hard strong patch within a very short time. Patches weighing 2½ tons and more are conveniently applied to slag-coated ladle walls using the above-described method. Hence, within a very short time molten steel can be poured into the ladle at which time some gassing is observed at the weep holes. After the ladle is emptied, the patch is found intact, and the slag is found to be removed more completely from the surface of the patched area than from the surrounding surface areas.

Example 5

This example further illustrates the adhesive composition of this invention in gunning operations. The catalyzed refractory aggregate is prepared as in Example 4 (Table 2) and stored in paper bags. The adhesive composition employed is a composition of this invention prepared by a procedure similar to that of Example 1. The stored aggregate is charged to gunning equipment such as that described in Example 4 and conveyed to the nozzle at the rate of about 5 tons per hour in a high velocity air stream. The adhesive composition is discharged at ambient room temperature into this air stream at the nozzle, and the high velocity air stream conveying the mixture of catalyzed refractory aggregate and binder is directed against the wall. The adhesive composition is applied at the rate of 4.5 to 5.5% by weight based on the weight of the conveyed aggregate. In the demonstration of this example, in which the ladle rests on its side, a patch around the entire circumference of the bottom wall is installed even though it involves directing the high-velocity refractory mix upwards and applying several tons of refractory to the overhead portion of the ladle wall. While some rebound is encountered, the entire circle is readily patched and the refractory mix exhibits a remarkable degree of adhesion to even the overhead portion of the ladle wall. It is noted that the ladle which is patched in this example is lined in accordance with the usual practice with an acidic type refractory brick, and the surface to which the patch is applied is covered by a slag-like glaze of unknown composition. Again, considerable gassing is observed when steel is poured into the ladle as evidenced by vapor or flames at the weep holes, but after the ladle is emptied it is again found that the entire patch is in excellent condition and that surprisingly little slag adheres to the face of the patched area as compared to the surface of the rest of the lining.

Basic oxygen furnace linings, or lining patches, are produced in accordance with this invention by methods similar to that illustrated by Examples 4 and 5 above, except that it is preferred that the binder of this invention be used in amounts somewhat higher than those illustrated above. For example, binder in amount of 7–12% based on the weight of the refractory is preferred for use in fabricating patches in the so-called "knuckle" area of a basic oxygen furnace, and the patches thus formed have been found to greatly extend the useful life of a basic oxygen furnace. The uncatalyzed composition of this invention is very stable and may also be applied at elevated temperatures, e.g., 100 to 140° F. The uncatalyzed composition of this invention, i.e., those having pH's between 4 and 6, may be held at these elevated temperatures for long periods of time without adverse effects.

Example 6

The purpose of this example is to illustrate the unexpected superiority of the compositions of this invention with respect to the level of "solids" present upon cure.

The procedure of Example 3, Test No. 3–7, was followed for the preparation of the resin utilized in this example. This resin was used as component A in the preparation of each of the compositions tested in this example, in amounts specified in Table 3. A catalyst solution was prepared to provide 10% sodium hydroxide in a 50:50 water-furfuryl alcohol solution. Compositions labeled 6–1, 6–2 and 6–3 were prepared. Each of these compositions contained 9% of the catalyst solution based on the weight of the composition. Each composition contained, therefore, 0.9% sodium hydroxide catalyst. Compositions 6–2 and 6–3, respectively, contained in addition to the component A resin 2-ethylfurylacrolein (EFA) and cyclohexanone, respectively, in percent amounts set forth in Table 3 as "Component B." The "solids" test performed on the compositions of this example was carried out as follows: A 3 gram sample was permitted to cure overnight at room temperature in a weighed aluminum dish, then heated at 85° C. for one hour and finally at 165° C. for one hour (triplicate determinations were made on each sample). The weight remaining (considered as solids) was then determined, and the percent solids was calculated both on the basis of the adhesive composition and on the basis of the resin employed in a composition and the results of these calculations are tabulated in Table 3.

TABLE 3

| Composition | Viscosity, cps./25° C. | Component A | Component B | Percent "Solids" based on— | |
|---|---|---|---|---|---|
| | | | | Catalyzed composition | Component A |
| 6–1 | 17,500 | Resin (91%) | None | 79.9 | 82.7 |
| 6–2 | 875 | Resin (68.2%) | 2-ethyl furylacrolein (22.8%) | 67.8 | 99.5 |
| 6–3 | 62 | Resin (54.6%) | Cyclohexanone (36.4%) | 81.7 | 124 |

It is noted that the 165° C. temperature of the above solids test is well above the boiling point of cyclohexanone and is also far above the 105° C. temperature specified in several standard resin or varnish "solids" tests. (See ASTM D–1644–59 and D–1259–61.) It is clear that composition 6–3 which is in accordance with the composition of this invention is unexpectedly far superior to the other two illustrative compositions which are not in accordance with this invention. This is even more startling when the data of Table 3 is considered in light of the 17,500 viscosity of the resin (component A and Composition 6–1) as compared to the viscosity of 62 cps. for Composition 6–3 which is in accordance with this invention.

Example 7

This example illustrates the use of the composition of this invention to produce a novel foundry mix. A composition of this invention was prepared by mixing three parts of the resin produced in Example 2 with two parts of cyclohexanone. This composition (140 parts) was thoroughly admixed with Wedron silica sand (2,000 parts) and catalyst (35 parts of 20% aqueous sodium hydroxide). The resulting novel foundry mix was formed into 2 x 2 inch cylinders for standard compression strength tests. Cylinders were removed from the mold and compressive strengths (p.s.i.) were determined on some samples after five hours' cure at room temperature and on others after overnight cure at room temperature and average compressive strengths of 323 p.s.i. and 1,000 p.s.i., respectively, were observed. The adhesive composition of this invention is useful in a foundry mix as a binder at concentrations of 1.5% to 12% by weight based on the weight of the sand, preferably between 1.5% and 3.0% in preparations similar to Example 7.

Example 8

This example illustrates the degree of "coking" achieved utilizing the composition of this invention. Two compositions labeled Composition 8–1 and 8–2, respectively, were prepared by admixing 90 parts of the resin of Example 6 with 30 parts of 2-ethylfurylacrolein and 90 parts of the resin of Example 6 with 30 parts of cyclohexanone, respectively. Composition 8–1 is similar to Composition 6–2 of Example 6 and is not in accordance with this invention, while Composition 8–2 is similar to Composition 6–3 of Example 6 and is in accordance with this invention. Each of these compositions were tested in a formulation of 1,000 parts of Wedron silica sand, 70 parts binder composition and 14 parts catalyst (20% aqueous sodium hydroxide). Test cylinders (2 x 2") were rammed utilizing each of these compositions. The cylinders were buried in a sand-coke mixture and pyrolized at 1750° F. for about 4½ hours in a gas fired muffle furnace, and then returned to room temperature. The cylinders were subsequently removed, broken up and smaller samples were taken for the "carbon determination" which consisted of carefully weighing a sample, burning it off in an oxidizing atmosphere at 950° C. for 1½ hours, cooling to room temperature and reweighing. The difference between the last two weightings is used in calculations as the amount of carbon in the analyzed sample. The percent carbon was calculated on the basis of the weight of the binder. The results are summarized in Table 4.

Table 4

Percent carbon after pyrolysis
Composition 8-1 _____ 27.8
Composition 8-2 _____ 28.7

It is apparent that with respect to degree of coking, the composition of this invention (8-2) is equal to the compostiion (8-1) which contains a so-called reactive diluent.

Example 9

The purpose of this example is to illustrate a comparison of adhesive compositions utilizing other reactive or nonreactive solvents to the adhesive composition of this invention, and further to illustrate a comparison of foundry mixes utilizing these various compositions.

Nine foundry compositions are prepared from silica sand, resin (produced as in Example 2), a test solvent and a catalyst. The identity and level of solvent used in each test is summarized in Table 5, wherein percent diluent refers to the percent by weight of solvent based on the resin-solvent weight. Viscosity of the resin-solvent composition is determined. In each case the particular test composition of risin-plus-solvent (140 parts) is admixed with Wedron silica sand (2,000 parts) and catalyst (35 parts of 20% by weight aqueous sodium hydroxide). The resulting foundry mix is formed into 2 x 2 inch cylinders for standard compressive strength tests. Compressive strengths (p.s.i.) at 40° F. are determined on some of the samples after 5 hours' cure at 40° F. Compressive strengths at room temperature are determined on other samples after 5 hours' cure at room temperature. Gel time data and percent solids data reported in Table 5 are obtained by procedures defined above. The data is summarized on Table 5; only Tests 9-6, 9-7 and 9-8 are in accordance with this invention.

A resin prepared as in Example 2 is admixed with cyclohexanone in a 3:1 weight ratio. The resulting composition (75 parts) was admixed with resorcinol (19 parts) to produce an adhesive composition in accordance with this invention.

A test portion of this composition was admixed with a mixture of the following catalysts: $Ca(OH)_2$ (2% by weight), and $NH_4(OH)$ (2% by weight) where percent is based on the resin-cyclohexanone composition. This catalyzed mixture advanced to a rubbery gel in about five minutes and, therefore, was deemed too "fast" for use as in laying-up laminates.

However, an identical formulation, with the $NH_4(OH)$ omitted, was used to lay-up a glass mat laminate as follows: A portion of the catalyzed adhesive composition was spread on aluminum foil, a sheet of glass mat was rolled into the spread adhesive to distribute the adhesive in the glass mat, another portion of catalyzed adhesive was spread on this mat, and a second mat rolled into this adhesive, and so on until a four ply laminate was fabricated. When the four ply laminate was completed, it was covered with aluminum foil and rolled again at room temperature, and then pressed under 15 p.s.i.g. in a hydraulic press. The laminate was removed from the press and cured at 85° C. for 4 hours and then at 110° C. for 2 hours. The resulting strong laminate exhibited no blistering.

Example 11

The purpose of this example is to illustrate another use of the novel adhesive composition of this invention, namely, its use as a mastic. Resin produced as in Example 2 was admixed with cyclohexanone in a 3:1 weight ratio to produce the adhesive composition of this invention. This composition (24 parts) was admixed with Wedron silica sand (50 parts), silica flour (10 parts)

TABLE 5

| Test No. | Percent Diluent [1] | Viscosity (cps.) | Toxicity dermal LD 50 | Compressive strength (p.s.i.) | | Gel time (secs.) | Percent solids (catalyzed) |
|---|---|---|---|---|---|---|---|
| | | | | Rm. temp. | 40° F. | | |
| 9-1 | 25 EFA | 970 | 1,103 | 57 | 2 | 27.53 | 72 |
| 9-2 | 25 FA | 484 | 3,725 | 26 | 0 | | |
| 9-3 | 25 FAC | 2,040 | 2,025 | 404 | 12 | | |
| 9-4 | 25 FMEK | 1,335 | 1,480 | 661 | 16 | | |
| 9-5 | 33 FMEK | 660 | 218 | 863 | 121 | | |
| 9-6 | 25 Cy | | 3,040 | | | | |
| 9-7 | 33 Cy | 115 | 3,720 | | | 18 | |
| 9-8 | 40 Cy | 51 | | 1,000 | 58 | 47 | 84 |

[1] EFA—2-ethylfurylacrolein, FA—furfuryl alcohol, FAC—furfurylidene acetone, FMEK—furfurylidene methyl ethyl ketone, Cy—cyclohexanone.

The data of Table 5 illustrates the low toxicity of the compositions of this invention, the high compressive strength, rapid gel and high solids level even at high cyclohexanone levels. Comparison of the compressive strength of the cured mix of this invention with the strength obtained from mixes utilizing so-called "reactive solvents," (EFA and FA) shows that the composition of this invention is vastly and totally unexpectedly superior (i.e., 1000 vs. 57 and 26 p.s.i., respectively). The difference in strength is particularly suprising in view of the fact that cyclohexanone by itself will show no apparent reaction when catalyzed in like manner.

While Test 9-5 shows high strength (though greatly inferior to that of 9-8 which is in accordance with this invention) toxicity of the 9-5 adhesive composition appears to be at a dangerous level. Attention is also called to the astounding difference in viscosity which is observed in these test binders and the fact that the extremely high strength and cured solids level is achieved in accordance with this invention in spite of the very low viscosity of the binder system.

Example 10

The purpose of this example is to illustrate another use of composition of this invention, namely, in the fabrication of glass laminates.

tetraethylenepentamine (1.2 parts) to form a dark brown mortar-like mastic. When spread on a concrete surface, it was found to adhere tenaciously, and it became hard in about 8 minutes. After standing at room temperature for one week the exposed surface exhibited a Shore D hardness of 45 to 50. After one month Shore D hardness was 70. Wiping of an acetone-wet towel across surface failed to transfer color to the towel.

Example 12

The purpose of this example is to illustrate further the unexpected superiority of cyclohexanone over other high boiling ketones when in combination with resins in accordance with this invention. A resin was produced in a step sequence substantially as in Example 2 above, except that reaction times were increased so that the resin produced had a viscosity of 1075 cps. at 25° C. Portions of the resin were diluted (3 parts resin to one part of ketone) in tests numbers 12-1, 12-2 and 12-3, in which cyclohexanone, diisobutylketone and isobutylheptyl ketone, respectively, were employed as solvents. Viscosity at 25° C., gel time and percent solids were determined on each and the results are tabulated in Table 6.

TABLE 6

| Test No. | Solvent | Viscosity (cps.) | Gel time | Percent solids |
|---|---|---|---|---|
| 12-1 | Cyclohexanone | 130 | 16 sec. (firm) | 95.2 |
| 12-2 | Diisobutylketone | 125 | 30 sec. (firm) | 55.6 |
| 12-3 | Isobutylheptyl ketone | 356 | 18 sec. (soft) [1] | |

[1] Solvent separates at 3.5 minutes when gel becomes firm.

The percent solids was determined by the procedure described in Example 6 except that the residual sample weight is reported as "percent solids," based on the catalyzed sample weight (after deducting the proportional weight of FA-water catalyst diluent from the catalyzed sample weight).

It is noted that while the adhesive of Test 12-2 shows desirable viscosity and gel time, it evidenced an unsatisfactory percent solids on cure. Since the cured resin in Test 12-3 evidenced incompatability with solvent (i.e., separation) sampling for a per cent solids test would probably not be representative. The Test 12-3 gel time of 18 seconds represents formation of a soft mushy gel; an exotherm started after about 1 minute, and the gel hardened at about 3.5 minutes at which time separation of solvent was observed.

However, the remarkable composition of this invention, as evidenced by the data of Test 12-1 in Table 6, was entirely satisfactory in every respect, curing to a firm gel in 16 seconds; and, it evidenced no separation or incompatability of components on cure. In spite of the presence of the cyclohexanone, a material which by itself evidences no polymerization when catalyzed in the same manner, the composition of this invention (Test 12-1) cured to give over 95% solids, based on the weight of the catalyzed sample.

Hence, it is clear from the above disclosure that the novel composition of this invention provides an unexpected advance in the art. This adhesive composition provides the art with a new adhesive, the viscosity of which can be adjusted over an extremely wide range while leaving the level of cured "solids" substantially unchanged. Moreover, its use in accordance with the disclosure provides an exciting advance in the art of fabricating and/or repairing monlithic basic refractory linings.

Therefore, we claim:

1. A liquid binder composition comprising less than 50% by weight cyclohexanone and more than 50% by weight resin produced by the acidic resinification of a composition comprising A moles of formaldehyde and B moles of furylethylenealdehyde of the general formula

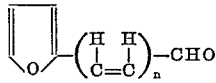

wherein $n$ is a number from 1 to 7 inclusive, and A and B being numbers such that the ratio A/B is in the range of zero to 1.5, inclusive.

2. A composition as in claim 1 in which $n$ is a number from 1 to 4, inclusive.

3. A composition as in claim 1 in which the ratio A/B is zero.

4. A composition as in claim 1 in which cyclohexanone is present in an amount up to 0.67 parts per part of said resin.

5. A refractory mix comprising: an alkaline refractory material in an amount greater than 50% by weight based on the weight of the mix; a basic catalyst selected from the group urea, caustic, ammonia, calcium hydroxide, and tri-ethylene-tetramine; and a binder in an amount between 1.5% and 12.0% by weight based on the weight of the refractory material, said binder including cyclohexanone in an amount less than 50% by weight based on the weight of the binder and resin produced by the acidic resinification of a composition comprising A moles of formaldehyde and B moles of furylethylenealdehyde of the general formula

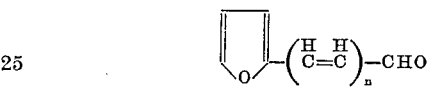

wherein $n$ is a number from 1 to 7 inclusive, said A and B being numbers such that the ratio A/B is in the range of zero to 1.5, inclusive, said resin being present in the binder in an amount greater than 50% by weight based on the weight of the binder.

6. A refractory mix as in claim 5 in which the ratio A/B is zero, said binder being present in an amount up to about 10% by weight and the basic catalyst is triethylene tetramine.

References Cited

UNITED STATES PATENTS 2,660,573  11/1953  Lantz.
2,749,322   6/1956  Lissant.
2,527,714  10/1950  Dunlop.

OTHER REFERENCES

Rubber World, Materials and Compounding Ingredients for Rubber and Plastics, 1965, p. 646 and 647.

Doolittle, Technology of Solvents and Plasticizers, 509 (1954).

MORRIS LIEBMAN, *Primary Examiner.*

H. H. FLETCHER, *Assistant Examiner.*

U.S. Cl. X.R.

260—37, 67; 264—30, 43, 44, 121, 309

CERTIFICATE OF CORRECTION

Patent No. 3,448,069          Dated June 3, 1969

Inventor(s) Lloyd H. Brown and David D. Watson

It is certified that error appears in the above-identified patent and that said Letters Patent are hereby corrected as shown below:

Column 4, line 44 reading "he" should read -- the --.
Column 5, line 74 reading "In" should read -- If --.
Column 6, line 7 reading "parts in" should read -- parts are in --. Column 7, line 28 reading "recator contents where" should read -- reactor contents were --. Column 8, line 29 reading "steam" should read -- stream --. Table 5, that portion of Test 9-1 reading "27.53" should read -- 27-53 --.

SIGNED AND
SEALED
MAR 24 1970

(SEAL)
Attest:

Edward M. Fletcher, Jr.
Attesting Officer

WILLIAM E. SCHUYLER, JR.
Commissioner of Patents